United States Patent Office 2,994,676
Patented Aug. 1, 1961

2,994,676
INTERPOLYMER OF ACRYLONITRILE, ACRYL-AMIDE, ETHYL ACRYLATE, AND HIGHER ALKYL ACRYLATE, AND AQUEOUS DISPERSIONS THEREOF
John Kucsan, Philadelphia, and Benjamin B. Kine, Levittown, Pa., assignors to Rohm & Haas Company, Philadelphia, Pa., a corporation of Delaware
No Drawing. Filed Apr. 18, 1958, Ser. No. 729,228
7 Claims. (Cl. 260—29.4)

This invention relates to copolymers and aqueous compositions adapted for the coating of various substrates. It is particularly concerned with aqueous emulsion copolymers adapted to be employed as a composition for producing thermoplastic or thermosetting coatings whether clear or pigmented.

It is an object of the present invention to provide improved coating compositions which are resistant to ultraviolet light so that they are adapted to be exposed to sunlight without suffering undue deterioration thereby. Another object of the present invention is to provide aqueous dispersions of neutral emulsion copolymers which are adapted to form coatings of either thermoplastic or thermosetting character. Another object of the invention is to provide aqueous dispersions of emulsion copolymers characterized by excellent mechanical stability and improved capacity for the incorporation of pigments therein without loss of stability. Another object of the invention is to provide aqueous dispersions of emulsion copolymers adapted to form durable coatings, especially those obtained in conjunction with certain cross-linking resins. Another object of the invention is to provide an aqueous dispersion of an emulsion copolymer of an amide of acrylic or methacrylic acid which is free of copolymerized units containing halogen atoms and which is adapted to form with certain cross-linking thermosetting resins wash-resistant, solvent-resistant, and infusible coatings. Other objects and advantages of the compositions of the invention will be apparent from the description thereof hereinafter.

In accordance with the present invention, it has been discovered that improved aqueous coating compositions capable of accomplishing the above-mentioned objects in efficient manner are obtained from the emulsion copolymerization of a mixture of monoethylenically unsaturated copolymerizable molecules consisting of 1% to 5% by weight of an amide of acrylic acid or methacrylic acid, 15% to 35% by weight of a nitrile of acrylic acid or methacrylic acid, and 84% to 60% by weight respectively of a mixture of certain acrylic acid esters consisting of ethyl acrylate and at least one other ester of acrylic acid with an aliphatic alcohol having 3 to 8 carbon atoms, the proportion of ethyl acrylate being from ¼ to ¾ of the total ester component.

The aqueous dispersions are preferably prepared by emulsifying and then copolymerizing with the aid of a free radical addition polymerization initiator or catalyst a mixture of the monomers specified above in the proportions specified. The emulsification and polymerization may be assisted by the use of an emulsifying agent either of anionic, non-ionic, or cationic type. Such agent also serves to stabilize the dispersion of the copolymer after completion of the polymerization. The proportion of emulsifier may be from about 1% to 6% based on the total weight of monomers. The proportion of initiator may be 0.1% to 3% by weight, based on the weight of monomers. The molecular weight of the copolymers may range from about 10,000 to as high as several million such as 5,000,000.

The temperature of polymerization of the emulsified monomers may be from 0° to about 100° C., preferably from about 30° to 80° C.

Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites and the salts, such as the sulfates, of metals which are capable of existing in more than one valence state such as cobalt, iron, nickel, and copper. The most convenient method of preparing the dispersions of copolymers comprises agitating an aqueous suspension or emulsion of a mixture of copolymerizable monomers and a redox catalytic combination at room temperature without the application of external heat. The amount of catalyst can vary but for purposes of efficiency from 0.01% to 3.0%, based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical, and hence preferred, to produce dispersions which contain about 30% to 50% resin-solids.

The copolymer dispersion thereby obtained may be employed directly with or without dilution with water for the coating of such materials as paper, leather, textiles, and metals which may either be bare or primed with known commercial primers. They may also be employed for the coating of stone, cement, concrete, bricks, asbestos-cement shingles, cinder block, and other masonry surfaces which are ordinarily subjected to moist conditions during use for the purpose of providing water-resistant coatings thereon. Such coatings serve to prevent the leaching of calcium, magnesium, and other salts normally present in the cementitious types of products which ordinarily cause efflorescence, that is the formation of a white disfiguration or discoloration at the surface of the products on wetting.

In general, the aqueous dispersions of the copolymer may be employed as a clear composition to provide a thin, clear, glossy transparent coating of highly decorative nature. If desired, however, dyes, fillers, or pigments can be included, the amount varying in dependence upon the particular purpose for which the composition is intended. Examples of water-soluble pigments which may be used include azo pigments and lakes, phthalocyanine pigments, vat dystuffs in their water-insoluble form, and inorganic pigments such as carbon black, iron oxides, chrome yellows, titanium dioxide and lithopone. Powdered or flaked metals may also be included, such as aluminum, bronze, brass, chromium, or gold. Mixtures may be used if desired. The proportion of pigment used may vary from about 5% to 100% by weight, based on the weight of the copolymer.

In addition to the other ingredients, the aqueous dispersions may contain a water-soluble thickening agent, such as gum tragacanth, water-soluble cellulose ethers, polyvinyl alcohol or partially saponified polyvinyl acetate. The aqueous dispersions may contain a mild alkali, for example, sodium acetate, sodium carbonate, chalk, morpholine or ammonia, including, if desired, a mixture of water-soluble substances which form a conventional mildly alkaline buffer. The proportions of the several ingredients in the aqueous dispersions can be varied widely, and they are adjusted in any convenient manner so that the dispersions of pastes have a consistency suita dispersing agent for the copolymer. The composition is diluted with 300 parts of water and sprayed upon asbestos cement shingles which are then dried at 140° C. The "bloom" or efflorescence which normally occurs during the first six months of weathering of such shingles is prevented by this coating.

*Example 2*

An aqueous dispersion of an emulsion copolymer of 20 parts of acrylonitrile, 3 parts of methacrylamide, 57 parts of ethyl acrylate, and 20 parts of butyl acrylate is prepared as in Example 1. An aqueous coating composition is prepared containing 1% by weight of this copolymer, 0.2% of a melamine-formaldehyde condensate consisting largely of hexamethylol melamine, 0.5% of a copper phthalocyanine blue pigment, 0.11% of ammonia, 0.05% of an ethylene oxide condensate of t-octylphenol containing about 10 oxyethylene units, 0.075% of sodium alginate, and 0.20% of the hydrochloride of 2-methyl-2-aminopropanol-1. Ammonium hydroxide was added to this composition to adjust the pH to about 8.5.

A piece of 80 x 80 cotton sheeting was passed through the pigment dispersion and was then passed through the nip of a pair of squeeze rolls. It was supported in a tenter frame and dried by exposure to the ambient atmosphere for 5 minutes. It was then cured while still on the frame for 10 minutes at 300° F. The fabric remained soft and flexible. It showed good resistance to washing and laundering (tested by washing 40 minutes in 0.1% sodium stearate at 180° F. while tumbling, followed by several ten-minute rinses in water); it was resistant to dry-cleaning by the use of perchloroethylene; and it exhibited practical resistance to crocking.

*Example 3*

The procedure of Example 2 is repeated using a copolymer of 20% of acrylonitrile, 3% of methacrylamide, 20% of ethyl acrylate, and 57% of 2-ethylhexyl acrylate. The pigment-dyed fabric is similar to that of Example 2 and is characterized by outstanding softness and draping qualities.

It is to be understood that changes and variations may be made without departing from the spirit and scope of the invention as defined by the appended claims.

We claim:

1. An aqueous composition comprising an aqueous medium in which there is dispersed a water-insoluble linear addition copolymer of 15 to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component.

2. A water-insoluble linear addition copolymer of 15% to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component.

3. An aqueous composition comprising an aqueous medium in which there is dispersed a water-insoluble linear addition copolymer of 15 to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component and a water-dispersible condensate of formaldehyde with an aminotriazine, the ratio of the copolymer to the condensate being from 3:1 to 7:1.

4. An aqueous composition comprising an aqueous medium in which there is dispersed a water-insoluble linear addition copolymer of 15 to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component and a water-dispersible condensate of formaldehyde with melamine, the ratio of the copolymer to the condensate being from 3:1 to 7:1.

5. An aqueous composition comprising an aqueous medium in which there is dispersed a water-insoluble linear addition copolymer of 15 to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component and a water-dispersible condensate of formaldehyde with an aminotriazine, the ratio of the copolymer to the condensate being from 3:1 to 7:1, said composition containing 0.1% to 2% by weight of an acidic catalyst.

6. An aqueous composition comprising an aqueous medium in which there is dispersed a water-insoluble linear addition copolymer of 15 to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component and a water-dispersible condensate of formaldehyde with melamine, the ratio of the copolymer to the condensate being from 3:1 to 7:1, said composition containing 0.1% to 2% by weight of an acidic catalyst.

7. An aqueous composition comprising an aqueous medium in which there is dispersed a water-insoluble linear addition copolymer of 15 to 35% by weight of a nitrile of a member of the group consisting of acrylic acid and methacrylic acid, 1 to 5% by weight of an amide selected from the group consisting of acrylamide and methacrylamide, and 84 to 60% by weight respectively of acrylic acid esters consisting of ethyl acrylate and at least one ester of acrylic acid with an aliphatic alcohol having 3 to 8 carbon atoms, the proportion of ethyl acrylate being from one-fourth to three-fourths of the total ester component and a water-dispersible condensate of formaldehyde with an aminotriazine, the ratio of the copolymer to the condensate being from 3:1 to 7:1, said composition containing a pigment, the proportion of the pigment being 5 to 100% by weight of the total weight of copolymer and condensate.

References Cited in the file of this patent

UNITED STATES PATENTS

| | | |
|---|---|---|
| 2,536,050 | Fluck | Jan. 2, 1951 |
| 2,582,303 | Wohnsiedler et al. | Jan. 15, 1952 |
| 2,787,561 | Sanders | Apr. 2, 1957 |
| 2,787,603 | Sanders | Apr. 2, 1957 |